Figure 1:
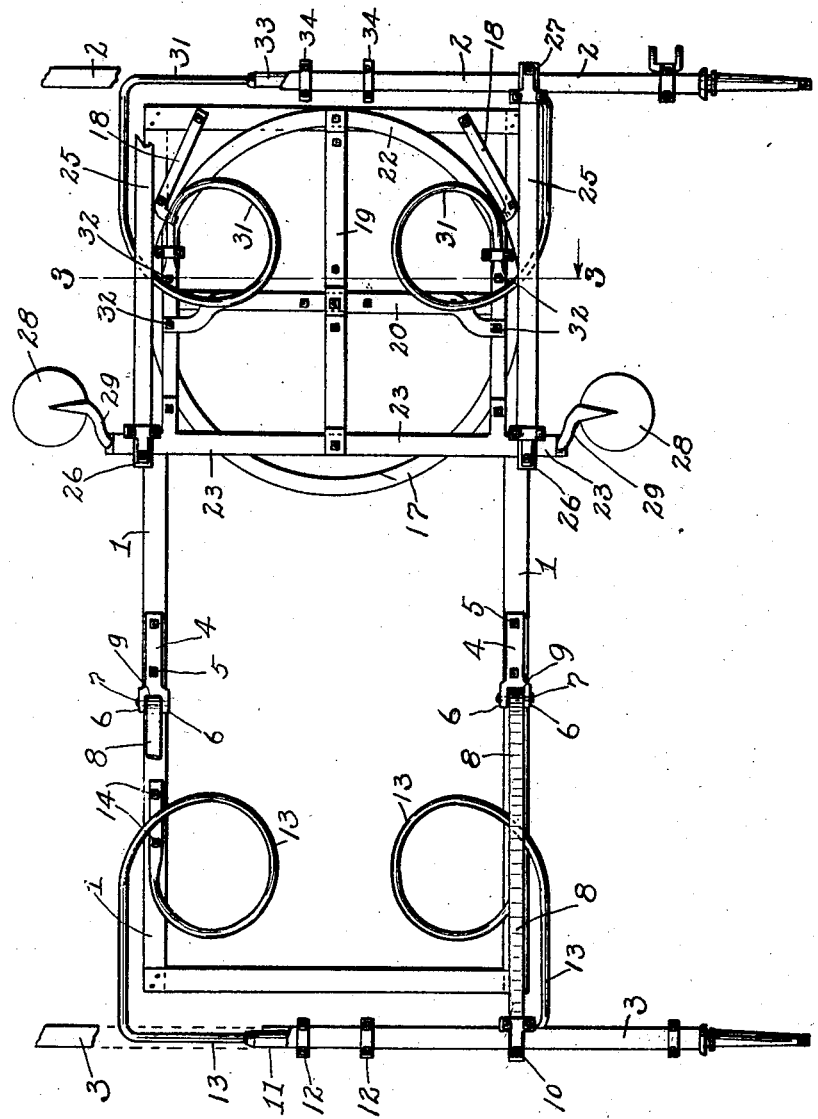

R. B. SHERIDAN.
CARRIAGE AND WAGON RUNNING GEAR.
APPLICATION FILED SEPT. 24, 1908.

912,189.

Patented Feb. 9, 1909.
2 SHEETS—SHEET 1.

R. B. SHERIDAN.
CARRIAGE AND WAGON RUNNING GEAR.
APPLICATION FILED SEPT. 24, 1908.
912,189.
Patented Feb. 9, 1909.
2 SHEETS—SHEET 2.
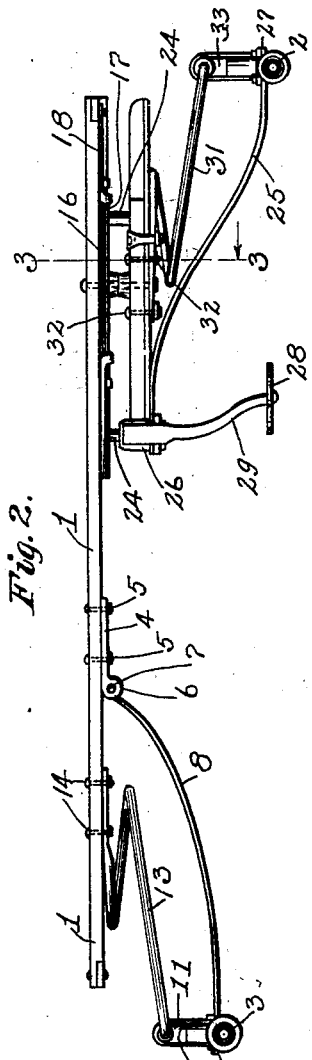
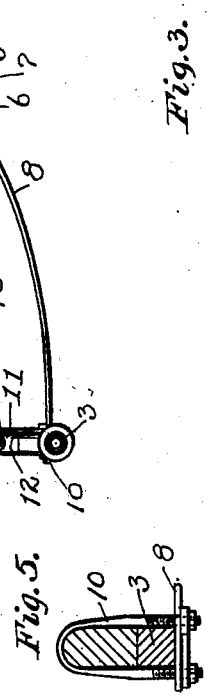
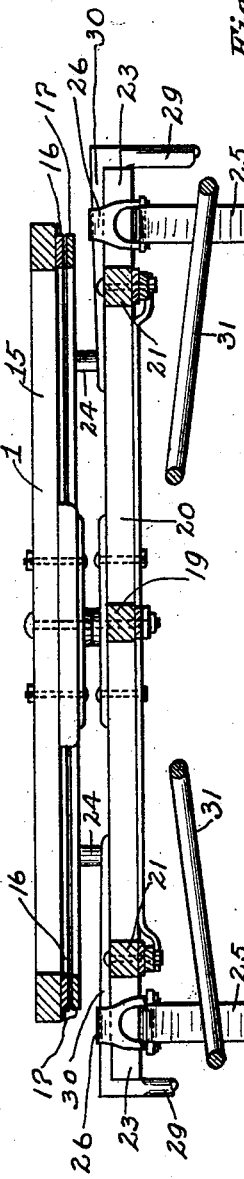
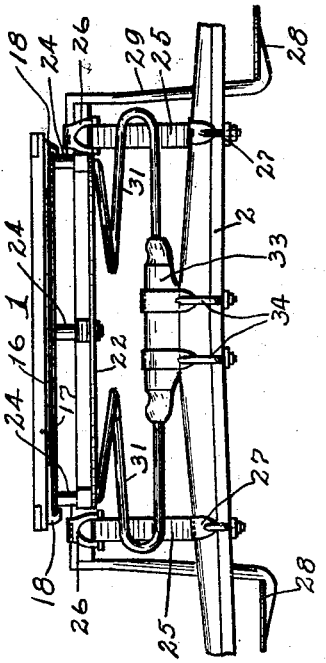
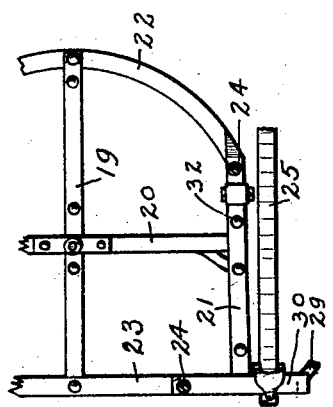
Witnesses,
Wm Whaley
Roy V. Myers
Inventor,
Richard B. Sheridan
By Cyrus Kehr
Attorney

UNITED STATES PATENT OFFICE.

RICHARD B. SHERIDAN, OF KNOXVILLE, TENNESSEE.

CARRIAGE AND WAGON RUNNING-GEAR.

No. 912,189.

Specification of Letters Patent.

Patented Feb. 9, 1909.

Application filed September 24, 1908. Serial No. 454,636.

*To all whom it may concern:*

Be it known that I, RICHARD B. SHERIDAN, a citizen of the United States, residing at Knoxville, in the county of Knox and State of Tennessee, have invented new and useful Improvements in Carriage and Wagon Running-Gear, of which the following is a specification, reference being had to the accompanying drawing.

My invention relates particularly to a combination of parts with the axles and the carriage or wagon body, whereby said axles and body and said other parts form a novel combination operating in a new and desirable manner.

The improvement is characterized by the location of the fifth wheel rearward of the front wheel axle, by the presence of two sets of springs between each axle and the vehicle body, and by the absence of a reach connecting the front and rear wheel axles.

The object of the invention is to produce a vehicle in which a high degree of elasticity and a high degree of strength and durability are combined in the mechanism supporting the vehicle body.

In the accompanying drawings, Figure 1 is a bottom view of a vehicle embodying my improvement, the wheels being removed and portions of the axles and springs being broken away, and the vehicle body being represented merely by a lower frame; Fig. 2 is a side elevation of a structure shown in Fig. 1; Fig. 3 is a section on the line 3—3 of Figs. 1 and 2, looking in the direction of the arrow; Fig. 4 is a front elevation of the same structure; Fig. 5 is a detail of means for securing one end of the blade springs to the axles; Fig. 6 is a plan of the hound frame, portions being broken away.

Referring to said drawings, 1 is the framing of the lower portion of the vehicle body; 2 is the front axle; and 3 is the rear axle.

A little way rearward of the middle of the frame, 1, an anchor plate, 4, is applied to the lower face of said frame at each side of the latter by means of bolts, 5. At its rear end, said anchor plate has two horizontally-opposite ears or knuckles, 6, which are apertured horizontally and transversely to the length of the vehicle. The forward end of a blade spring (one-fourth of an elliptical spring), 8, rests between said ears and is secured thereto by means of a bolt, 7, extending horizontally through said ears and a sleeve, 9, on said spring. The rear end of each such spring is clamped to the bottom of the rear axle, 3, by means of an ordinary U-shape clip, 10, as shown in detail in Fig. 5. Upon the middle of said rear axle rests a bolster or block, 11. Said bolster is secured to said axle by two U-shape clips, 12, surrounding said axle and said bolster. In each end of said bolster is secured the horizontal end of a spring, 13, which is circular in cross section and which extends horizontally away from said bolster until it is approximately beneath the adjacent corner of the body frame, 1, and then turns forward toward the anchor plate, 4, and then it curves toward the middle of said body and forms a large, complete spiral, gradually rising, and then bearing by its end flatwise against the adjacent side rail of the body frame. Bolts, 14, secure said end immovably to said side piece.

By reference to Fig. 2 it will be seen that the two points of attachment of each blade spring, 8, are in a plane which is approximately parallel to a corresponding plane in which lie the two points of attachment of each of the adjacent spiral springs 13. This results from attaching the rear ends of the blade springs lower than the forward ends of said blade springs farther forward than the corresponding ends of the spiral springs. In these positions, said springs coöperate effectively to prevent rotation of the rear axle, 3, and at the same time the four springs provide an aggregate of strength which is ample for supporting the rear end of the vehicle without or with a load. And as to horizontal, transverse strains upon the rear axle or upon the rear portion of the vehicle body, it will be observed that, although the blade springs, 8, are parallel to each other and to the vehicle body, so that they are not theoretically well adapted for resisting such horizontal action, said spiral springs are well adapted to resist such transverse movement; for the two points of attachment of each of said springs is in a line which is oblique to the line in which the two points of attachment of the other of said springs lie, said points of attachment being the bolts, 14, and the adjacent end of the bolster, 11, (see Fig. 1).

Rearward of the front axle, 2, is a fifth wheel secured to the frame, 1. A cross bar, 15, forms a part of the body frame, 1, above the axis of the fifth wheel. A ring-form plate, 16, is bolted flatwise to the lower side of the frame, 1. Beneath said plate is a similar ring-form plate, 17, which is held in position by means of the stop plates or brackets, 18, which extend diagonally across the lower face of the body frame at each corner of the latter and sidewise beneath said ring-form plate without pressing against the latter sufficiently to bind it against the upper ring plate.

At a short distance below the lower ring plate, 17, is a hound frame consisting of a middle longitudinal piece, 19, a transverse middle piece, 20, two oblique side pieces or hounds, 21, a front curved plate, 22, joining the front ends of said hounds and the middle piece, 19, and a rear transverse piece, 23, joining the rear ends of said hounds and the rear end of said middle piece, 19, and projecting transversely beyond the ends of said hounds far enough to permit attachment of springs and steps, as hereinafter described. Small bolsters or puppets, 24, join said lower ring-form plate, 17, to said hound frame at any desired number of points. Two sets of springs similar to the springs at the rear end of the vehicle intervene between said hound frame and the front axle. Two of said springs are blade springs, 25, each of which is a fourth of an elliptical spring. The rear end of each of said springs is clamped to the adjacent end of the rear hound frame piece, 23, which projects outside of the adjacent hound. This is accomplished by means of two clips, 26, surrounding said transverse piece, 23, and said spring, while the front end of such spring is immovably clamped to the lower face of the front axle by means of a U-shape clip, 27. And two of said springs are spiral springs, 31, similar to the spiral springs, 13, which latter are applied at the rear end of the vehicle. The rear ends of said springs, 31, are secured to the hound frame by bolts, 32, while the front ends are secured to a block or bolster, 33, seated upon the middle portion of the front axle and secured thereto by clips, 34.

At each rear corner of the hound frame is a step, 28, having an approximately upright shank, 29, and at the upper end of said shank a horizontal arm, 30, extending over the adjacent end of the transverse piece, 23, and beneath the clip, 26, said clip serving to clamp said arm immovably to said transverse piece.

I claim as my invention:

1. In a vehicle, the combination of a body, a front axle, a fifth wheel secured to said body rearward of said axle, a hound frame secured to said fifth wheel, blade springs secured to said axle and to the rear portion of said hound frame, spiral springs secured to said axle and to the forward portion of said hound frame, a rear axle, and springs intervening between said rear axle and said body.

2. In a vehicle, the combination of a body, a front axle, a fifth wheel secured to said body rearward of said axle, a hound frame secured to said fifth wheel, blade springs secured to said axle and to the rear portion of said hound frame, spiral springs secured to said axle near the middle of the latter and to the forward portion of said hound frame, a rear axle, and springs intervening between said rear axle and said body.

3. In a vehicle, the combination of a body, a front axle, a fifth wheel secured to said body rearward of said axle, a hound frame secured to said fifth wheel, blade springs secured to said axle and to the rear portion of said hound frame, spiral springs secured by their ends to said hound frame and by their forward ends to a bolster seated upon the middle of said axle, a rear axle, and springs intervening between said rear axle and said body.

4. In a vehicle, the combination of a body, a front axle, a fifth wheel secured to said body rearward of said axle, a hound frame secured to said fifth wheel, blade springs secured to said axle and to the rear portion of said hound frame, spiral springs secured by their rear ends to said hound frame forward of the attachment of said blade springs and by their forward ends to said axle at points higher than the attachment of the front ends of said blade springs, a rear axle, and springs intervening between said rear axle and said body.

5. In a vehicle, the combination of a body, a front axle, a fifth wheel secured to said body rearward of said axle, a hound frame secured to said fifth wheel, blade springs secured to said axle and to the rear portion of said hound frame, spiral springs secured to said axle and to the forward portion of said hound frame, a rear axle, and a pair of blade springs and a pair of spiral springs intervening between said rear axle and said body.

6. In a vehicle, the combination of a body, a front axle, a fifth wheel secured to said body rearward of said axle, a hound frame secured to said fifth wheel, blade springs secured to said axle and to the rear portion of said hound frame, spiral springs secured to said axle and to the forward portion of said hound frame, a rear axle, and a pair of blade springs and a pair of spiral springs intervening between said rear axle and said body, the rear ends of said blade springs being attached to the rear axle at points lower than the points of attachment of the spiral springs.

In testimony whereof I have signed my name, in presence of two witnesses, this 17th day of September, in the year one thousand nine hundred and eight.

RICHARD B. SHERIDAN.

Witnesses:
CYRUS KEHR,
C. A. MORSE.